(12) United States Patent
Gao et al.

(10) Patent No.: US 9,885,521 B2
(45) Date of Patent: Feb. 6, 2018

(54) METHOD FOR MANUFACTURING REFRIGERANT GUIDE TUBE OF HEAT EXCHANGER, REFRIGERANT GUIDE TUBE MANUFACTURED USING THE METHOD AND HEAT EXCHANGER WITH THE REFRIGERANT GUIDE TUBE

(75) Inventors: Qiang Gao, Zhejiang (CN); Yanxing Li, Zhejiang (CN); Linjie Huang, Zhejiang (CN)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 642 days.

(21) Appl. No.: 13/991,821

(22) PCT Filed: Apr. 19, 2011

(86) PCT No.: PCT/CN2011/072993
§ 371 (c)(1),
(2), (4) Date: Jun. 5, 2013

(87) PCT Pub. No.: WO2012/075766
PCT Pub. Date: Jun. 14, 2012

(65) Prior Publication Data
US 2013/0248158 A1    Sep. 26, 2013

(30) Foreign Application Priority Data

Dec. 8, 2010 (CN) .......................... 2010 1 0578458

(51) Int. Cl.
*F28F 9/02* (2006.01)
*F28D 1/06* (2006.01)
(Continued)

(52) U.S. Cl.
CPC ................ *F28D 1/06* (2013.01); *B21C 37/14* (2013.01); *B21C 37/151* (2013.01);
(Continued)

(58) Field of Classification Search
CPC .... F28D 1/06; F28D 1/04; F28F 9/027; F28F 9/0273; B21C 37/14; B21C 37/157; B21C 37/156; B21C 37/151; B21C 37/158
See application file for complete search history.

(56) References Cited

U.S. PATENT DOCUMENTS 1,684,083 A    9/1928 Bloom
4,945,635 A    8/1990 Nobusue et al.
(Continued)

FOREIGN PATENT DOCUMENTS

CN    2679473 Y    2/2005
CN    1939654 A    4/2007
(Continued)

OTHER PUBLICATIONS

International Search Report dated Sep. 15, 2011 from corresponding PCT/CN2011/072993, pp. 8.
(Continued)

*Primary Examiner* — Len Tran
*Assistant Examiner* — Jon T Schermerhorn
(74) *Attorney, Agent, or Firm* — Ohlandt, Greeley, Ruggiero & Perle, LLP (57) ABSTRACT

A method for manufacturing a refrigerant guide tube of a heat exchanger and a refrigerant guide tube manufactured using the method and a heat exchanger with the refrigerant guide tube are disclosed. The refrigerant guide tube includes tube body and channels extending through a wall of the tube body. The tube body is formed by a butt joint of side edges of more than one bar-shaped plate materials along the length direction. The method allows forming the refrigerant channels of the guide tube before or during forming the tube body when the method is used to manufacture the guide tube, so (Continued)

as to avoid directly forming the channels on the tube body and make the process of manufacture the guide tube simpler and more convenient.

2 Claims, 10 Drawing Sheets

(51) Int. Cl.
  *B21C 37/15* (2006.01)
  *B21C 37/14* (2006.01)
  *B21C 37/18* (2006.01)
  *B23P 15/26* (2006.01)
  *F28D 1/04* (2006.01)
(52) U.S. Cl.
  CPC .......... *B21C 37/156* (2013.01); *B21C 37/157* (2013.01); *B21C 37/158* (2013.01); *B21C 37/185* (2013.01); *B23P 15/26* (2013.01); *F28D 1/04* (2013.01); *F28F 9/027* (2013.01); *F28F 9/0273* (2013.01); *Y10T 29/49391* (2015.01)

(56) References Cited

U.S. PATENT DOCUMENTS

| | | |
|---|---|---|
| 5,172,476 A | 12/1992 | Joshi |
| 2007/0062682 A1 | 3/2007 | Sagi et al. |
| 2007/0256821 A1* | 11/2007 | Mashiko ............... F28F 9/02 165/160 |
| 2008/0078541 A1 | 4/2008 | Beamer et al. |
| 2008/0223565 A1 | 9/2008 | Lai et al. |
| 2010/0300667 A1 | 12/2010 | Samuelson |

FOREIGN PATENT DOCUMENTS

| | | |
|---|---|---|
| CN | 1981975 A | 6/2007 |
| CN | 101107479 A | 1/2008 |
| CN | 101266093 A | 9/2008 |
| CN | 101691981 A | 4/2010 |
| CN | 101788213 A | 7/2010 |
| CN | 101788243 A | 7/2010 |
| EP | 1 826 523 A1 | 8/2007 |
| JP | 6314091 A | 1/1988 |
| JP | 03207540 | 9/1991 |
| JP | H04288461 A | 10/1992 |
| JP | 9-166368 A | 6/1997 |
| JP | 10267586 | 10/1998 |
| KR | 20000051820 A | 8/2000 |
| KR | 100467339 B1 | 1/2005 |
| KR | 100988217 B1 | 10/2010 |

OTHER PUBLICATIONS

European Search Report dated Aug. 30, 2017 for European Application No. 11847879.1.

* cited by examiner

METHOD FOR MANUFACTURING REFRIGERANT GUIDE TUBE OF HEAT EXCHANGER, REFRIGERANT GUIDE TUBE MANUFACTURED USING THE METHOD AND HEAT EXCHANGER WITH THE REFRIGERANT GUIDE TUBE

The present application is the US national phase of International Application No. PCT/CN2011/072993 filed on Apr. 19, 2011, which claims the benefit of priority to Chinese Patent Application No. 201010578458.7 titled "HEAT EXCHANGER AND REFRIGERANT GUIDE TUBE THEREOF AS WELL AS METHOD FOR MANUFACTURING REFRIGERANT GUIDE TUBE" and filed with the State Intellectual Property Office on Dec. 8, 2010, the entire disclosure of which is incorporated herein by reference.

FIELD OF THE INVENTION

The present application relates to the field of cooling technique, and in particular to a method for manufacturing a refrigerant guide tube used in a heat exchanger. Also, the present application relates to a refrigerant guide tube manufactured with the above method and a heat exchanger including the above refrigerant guide tube.

BACKGROUND OF THE INVENTION

A heat exchanger is an apparatus which transfers part of the heat of a hot fluid to a cold fluid, and is also called heat exchanging apparatus. The heat exchanger is widely used in the fields of HVAC (Heating, Ventilation, and Air Conditioning) and the like.

Figure 1:
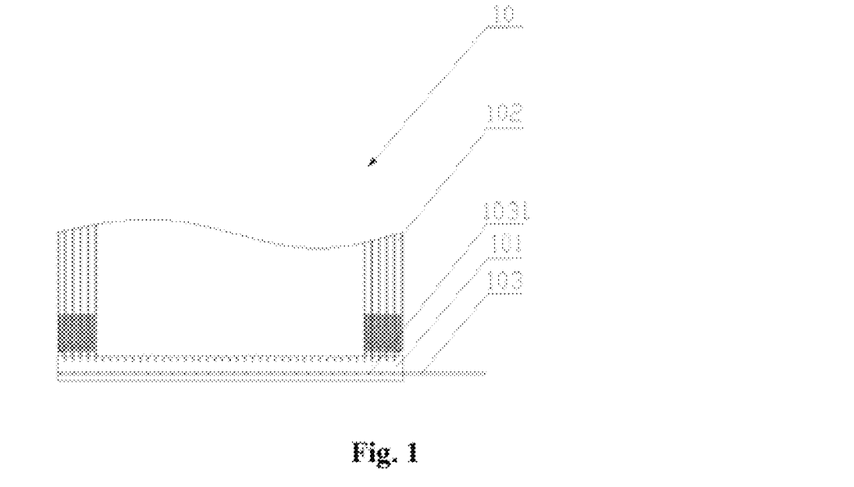
FIG. 1 is a schematic structural view of a heat exchanger in the prior art.

Please refer to FIG. 1, which is a schematic structural view of a heat exchanger in the prior art.

Currently, a typical heat exchanger 10 generally includes two manifolds 101 (only one manifold 101 at a side of the heat exchanger is shown in FIG. 1) arranged parallel to each other. Multiple heat exchanging tubes 102 are arranged substantially parallel to each other between the manifolds 101. Radiating fins are arranged at intervals between the heat exchanging tubes 102. The heat exchanging tube 102 has two ends communicating with the manifolds 101 at two sides of the heat exchanging tube. The refrigerant enters the heat exchanging tubes 102 through a manifold 101 at one side of the heat exchanger, thereby accomplishing heat exchanging.

In order to ensure that the refrigerant in the heat exchanger 10 is distributed in the heat exchanging tubes 102 evenly, generally a refrigerant guide tube 103 is inserted into each of the manifolds 101. The guide tube 103 is inserted into the bottom portion of each of the manifolds 101, and openings 1031 are arranged along the guide tube 103 and spaced at a certain interval. The ends of the guide tube 103 are sealed, and each opening 1031 in the guide tube 103 is responsible for distributing or collecting the refrigerant in the heat exchanging tube 102 in a corresponding area, so that the refrigerant can be distributed evenly through these openings 1031 into the respective heat exchanging tubes 102 to be recirculated, or, the refrigerant flowing out of the heat exchanging tubes 102 can be collected evenly into the guide tube 103 and then flow out of the heat exchanger. That is, the openings 1031 serve as passages for the refrigerant to flow into or out of the guide tube.

To manufacture the guide tube 103 with the openings 1031 as refrigerant passages, conventionally, the surface of the tube body of the guide tube 103 is directly processed and punched. In the case of a microchannel heat exchanger, the internal diameter of the guide tube 103 is relatively small. When functioning as a distribution tube, the diameter of the guide tube 103 is even smaller, around 10 mm. Therefore, it is technically difficult, not efficient, and costly to manufacture openings 1031 directly on the arc surface of the tube body of the guide tube 103. Furthermore, metal burrs and metal shavings and the like may be left on the inner side of the openings 1031 of the tube body. Since the diameter of the tube is small, the metal burrs and metal shavings inside the tube are difficulty removed, which may block the openings 1031 in operation of the system, and cause the refrigerant to be distributed unevenly. In some cases, the free metal shavings may even block the throttle mechanism and cause system failure.

Therefore, there is an urgent demand in the art to facilitate the manufacture of the openings on the refrigerant guide tube and remove the burrs and shavings on the inner side of the openings of the tube body.

SUMMARY OF THE INVENTION

An object of the present application is to provide a method for manufacturing a refrigerant guide tube used in a heat exchanger, by which the process of manufacturing the refrigerant passages on the guide tube is simpler. Another object of the present application is to provide a refrigerant guide tube manufactured with the above method. A further object of the present application is to provide a heat exchanger including the above refrigerant guide tube.

To solve the above technical problems, the present application provides a method for manufacturing a refrigerant guide tube used in a heat exchanger. The refrigerant guide tube includes a tube body and passages extending through the wall of the tube body, wherein the tube body is formed by jointing longitudinal side edges of one or more bar-shaped plates.

Preferably, the tube body is formed by butt joint of the longitudinal side edges of the one or more bar-shaped plates. Through holes are manufactured on at least one bar-shaped plate before the butt joint.

Preferably, the through holes are manufactured at a joint side edge; and the butt joint includes: pressing the two joint side edges close to each other along their surfaces, and sealing and fastening peripheries of the two joint side edges.

Preferably, the tube body is formed by making the longitudinal side edges of the one or more bar-shaped plates abut against each other. Grooves are manufactured on at least one joint side edge and extend in the thickness direction of the joint side edge before the longitudinal side edges of one or more bar-shaped plates abut against each other. Making the longitudinal side edges of one or more bar-shaped plates abut against each other includes: making the joint side edge having grooves abut against the other joint side edge along surfaces of the bar-shaped plates, such that the grooves are open towards the other joint side edge abutting against the grooves, and the grooves together with the other joint side edge form passages.

Preferably, there is a gap between at least two joint side edges to form a passage.

Preferably, surfaces of at least two joint side edges are arranged opposite to each other to form the gap, and the two joint side edges are bent in the same direction.

The method for manufacturing the refrigerant guide tube according to the present application includes jointing the longitudinal side edges of at least one bar-shaped plate to form the tube body. With the method to manufacture the guide tube, the refrigerant passages on the guide tube may be manufactured before or during formation of the tube body, so that manufacturing the passages on the tube body directly is avoided, and the process is simpler.

In a specific embodiment, the tube body is formed by butt joint of the longitudinal side edges of one or more bar-shaped plates, and through holes are manufactured on at least one of the bar-shaped plates before the butt joint. The process of manufacturing the through holes on the plate directly is relatively simple and may be performed by various manufacture methods, and through holes in various shapes may be manufactured. Secondly, after the through holes are manufactured, the plate can be processed to remove the burrs, metal shavings and the like, so that the edge of the through holes may easily be processed. The plates can be butt jointed to form the tube body after being processed.

In another specific embodiment, the tube body is formed by making the longitudinal side edges of one or more bar-shaped plates abut against each other. Grooves are manufactured on the at least one joint side edge and extend in the thickness direction thereof before the longitudinal side edges abut against each other. Also, making the longitudinal side edges of one or more bar-shaped plates abut against each other includes: making two joint side edges abut against each other along surfaces of the bar-shaped plates such that the grooves are open towards the other joint side edge abutting against the grooves. The grooves together with the other joint side edge form the passages. This embodiment only requires manufacturing grooves on the side edge, and when the side edges abut against to form the tube body, the grooves together with the joint side edge form passages. Thus, the process is simple.

In even another embodiment, a gap is left between the two joint side edges to form a passage. The embodiment utilizes the gap between the joint side edges as a refrigerant passage, and thus the manufacture process is simpler.

To achieve another object of the present application, the present application further provides a refrigerant guide tube used in a heat exchanger. The refrigerant guide tube includes a tube body and passages extending through the wall of the tube body, wherein the tube body is formed by jointing longitudinal side edges of one or more bar-shaped plates.

Preferably, the tube body is formed by butt joint of longitudinal side edges of one or more bar-shaped plates. The tube body is provided therein with through holes located at positions on the tube body other than the butt joint portion. The through holes form the passages.

Preferably, the through holes are distributed in circumferential direction of the tube body.

Preferably, surfaces of the joint side edges forming the tube body are arranged opposite to each other with a gap therebetween, and the through holes are provide on the joint side edges.

Preferably, the tube body is formed by making the longitudinal side edges of the bar-shaped plates abut against each other along the surfaces of the bar-shaped plates. At least one of the joint side edges forming the tube body is provided with grooves extending in the thickness direction. The grooves are open towards the other joint side edge. The grooves together with the other joint side edge form the passages.

Preferably, there is a gap between at least two of the joint side edges forming the tube body, and the gap forms the passage.

Preferably, the surfaces of the two joint side edges forming the gap are arranged opposite to each other. The two joint side edges are bent in the same direction.

Preferably, the tube body has at least two tube cavities.

The tube body of the refrigerant guide tube according to the present application is formed by jointing longitudinal side edges of at least one bar-shaped plate. The passage of the guide tube can be manufactured before or during formation of the tube body, so that manufacturing passages on the tube body directly is avoided, and the process is simpler.

To achieve another object of the present application, the present application further provides a heat exchanger including a heat exchanging tube, a manifold and a refrigerant guide tube inserted into the manifold. The refrigerant guide tube may be any of the guide tubes described above. Since the above refrigerant guide tube has the above-described technical effects, the heat exchanger including the refrigerant guide tube should also have the same technical effects.

BRIEF DESCRIPTION OF THE DRAWINGS

FIGS. 5-1 to 5-4 are schematic structural views of four kinds of bar-shaped plates used in the manufacture method according to the present application, respectively;

FIGS. 13-1 to 13-5 are schematic views of five cross sectional shapes of the refrigerant guide tube according to the present application, respectively;

FIGS. 15-1 to 15-5 are schematic views of five configurations of the passages of the refrigerant guide tube according to the present application, respectively; and FIGS. 16-1 to 16-3 are schematic views of three structures of the passages of the refrigerant guide tube according to the present application, respectively.

DETAILED DESCRIPTION OF THE INVENTION

An object of the present application is to provide a method for manufacturing a refrigerant guide tube used in a heat exchanger. When this method is used to manufacture the guide tube, processing the refrigerant passage on the guide tube is simpler. Another object of the present application is to provide a refrigerant guide tube manufactured with the above method. A further object of the present application is to provide a heat exchanger including the above refrigerant guide tube.

The refrigerant guide tube includes a tube body and passages through which the refrigerant flows into or out of the tube body. The passages serve for distributing the flow of the refrigerant and extend through the wall of the tube body. According to the method for manufacturing the refrigerant guide tube used in a heat exchanger of the present application, one or more bar-shaped plates, generally metal flat plates are required, with longitudinal side edges thereof being joined to form the tube body, which may be achieved in many ways, such as welding, compression joint, rivet joint, sliding joint or the like. The side edges may abut against each other inwards or outwards along the surfaces of the bar-shaped plates, or they may also be overlap jointed. Of course, the methods for jointing the side edges are not limited to the above methods, and all those methods by which the side edges can be jointed to form the tube body fall into the protection scope of the present application.

When forming the tube body of the guide tube with this method, the production process is more flexible and tube bodies having various cross sectional shapes may be formed. The tube body may be formed by jointing according to actual shape requirement, which is easily to be implemented in technique. Also, more than one bar-shaped plate is adopted so that the jointing can be easily implemented in technique. The cross sectional area of the tube body may also be gradually changed in the flow direction of the refrigerant by properly adjusting the shape of the bar-shaped plate or the contact area of the joint side edges or the like, so as to allow the refrigerant in two phases to be mixed more evenly. The guide tube formed by such bar-shaped plates may increase disturbance of the fluid refrigerant in two phases in the guide tube, so that the layering of the gaseous refrigerant and the liquid refrigerant is avoided, and the refrigerant is allowed to be distributed more evenly.

When manufacturing the guide tube with this method, refrigerant passages on the guide tube may be manufactured before or during the formation of the tube body, so that manufacturing passages on the tube body directly is avoided, and the process is further simplified. Also, as to the guide tube having complicated cross sectional shape, more than one bar-shaped plate is manufactured separately, so the difficulty in the manufacturing may be reduced effectively without the use of special mould, thereby saving the expense of the mould and thus reducing the cost of the production.

In order that the solution of the present application can be better understood by the person skilled in the art, the present application will be further described in detail in conjunction with the accompanying drawings and the specific embodiments below.

Figure 2:
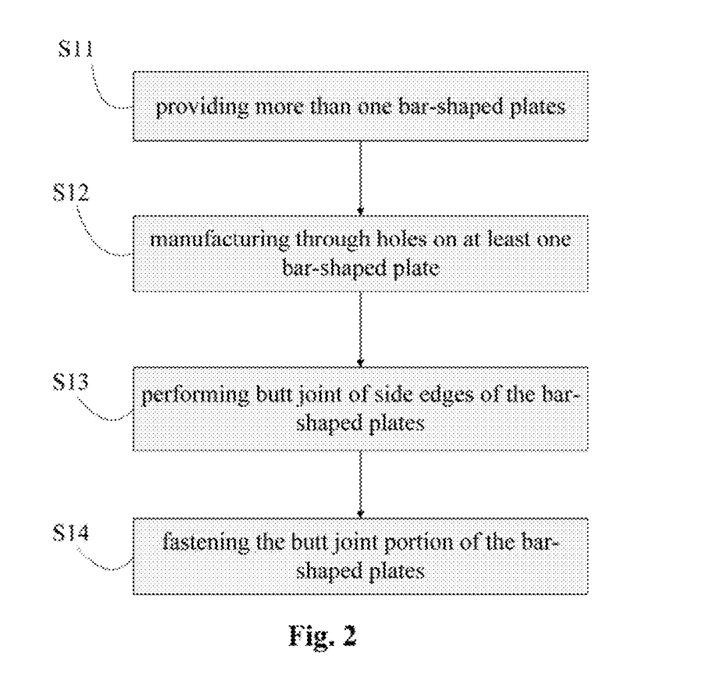
FIG. 2 is a flow chart of a first specific embodiment of the method for manufacturing a refrigerant guide tube according to the present application.

Please refer to FIG. 2, which is a flow chart of the first specific embodiment of the method for manufacturing a refrigerant guide tube according to the present application.

In the first specific embodiment, the manufacture method according to the present application includes the following steps:

Step S1: providing more than one bar-shaped plates.

Step S2: manufacturing through holes on at least one bar-shaped plate.

The stamping process is typically adopted; and of course, other manufacture methods may also be used. The number of the through holes may be determined according to actual requirement. Furthermore, in order to further enhance the effect of the flow guiding, a guide baffle for guiding the flow direction of the refrigerant may also be manufactured at each through hole. The guide baffle may be formed by stamping. The specific shape of the guide baffle may be selected synthetically according to factors such as degree of difficulty of the manufacture process, material property of the bar-shaped plate, size of the bar-shaped plate, effect of the flow guiding and the like.

Step S3, butt jointing side edges of the bar-shaped plates.

Step S4: fastening the butt joint portions of the bar-shaped plates.

Forming tube body via the above steps, the through holes on the bar-shaped plates are in communication with the inner space of the tube body, so as to form passages through which the refrigerant flows into or out of the tube body.

The process of manufacturing the through holes on the bar-shaped plate directly is relatively simple, and various manufacture methods may be adopted. Also, through holes may be manufactured in various shapes selectively, and thus the flowing form of the fluid can be controlled.

Secondly, during the formation of the through holes, substances such as burrs and shavings and the like may inevitably occur at the edge of the through holes due to the limitation of processing. The bar-shaped plates may be processed to remove the burrs and shavings after the through holes are formed and before the side edges are butt jointed. At that time, the burrs and shavings are on the surface of the bar-shaped plates and thus are easy to be removed. After being processed, the side edges of the bar-shaped plates are butt jointed to form the tube body, thus avoiding the through holes from being blocked by the burrs, shavings and the like. In addition, it is relatively easy to manufacture through holes on the bar-shaped plate, and the size and the pattern of through holes can be controlled to a large degree.

In step S2, through holes may be manufactured on each of bar-shaped plates.

After the tube body is formed, that is, after each bar-shaped plate forms part of the tube wall of the tube body, through holes are formed on the tube wall of the tube body and distributed in the circumferential direction of the tube body.

For example, four bar-shaped plates, with through holes manufactured thereon, may be adopted to form a tetragonal tube body by being butt jointed. In this case, each of the four side walls of the tetragonal tube body has through holes. Of course, the specific location and number of the through holes may be determined according to actual requirement.

Distributing the through holes on the tube body in the circumferential direction of the tube body may improve the distribution uniformity of flow of the refrigerant through the guide tube.

Through holes may also be manufactured on the joint side edges. When being butt jointed, two joint side edges are close to each other in face-to-face manner, and are then sealed and fastened, which may be achieved by bending one of the side edges. That is, a lateral ridge structure with a cavity is so formed on the tube body. As such, the upper side and/or the lower side of the lateral ridge have through holes. In this way, the orientation of the through holes may be adjusted as required so as to adjust the flow direction of the refrigerant.

Figure 3:
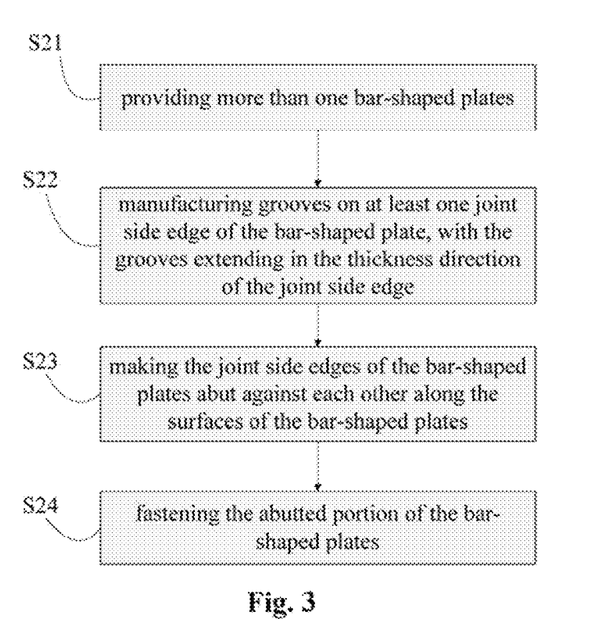
FIG. 3 is a flow chart of a second specific embodiment of the method for manufacturing a refrigerant guide tube according to the present application.

Please refer to FIG. 3, which is a flow chart of the second specific embodiment of the method for manufacturing a refrigerant guide tube according to the present application.

In the second specific embodiment, the manufacture method according to the present application includes the following steps:

Step S2: providing more than one bar-shaped plate.

Step S22: manufacturing grooves on at least one joint side edge of the bar-shaped plate, wherein the grooves extends in the thickness direction of the joint side edge.

The groove may be formed by stamping. The groove may have a cross section in the shape of arc, rectangle or the like. The groove with gradually changed depth may also be manufactured.

Step S23: bring the joint side edges of the bar-shaped plates into contact with each other along the surfaces of the bar-shaped plates.

When the side edges are brought into contact with each other, the joint side edge with the grooves contacts the other joint side edge along the surfaces of the bar shaped plates, with the grooves being open towards the other joint side edge in contact therewith. Then, the grooves together with the other joint side edge form channels communicating with the inner space of the tube body, so that the channels serve as passages through which the refrigerant flows into the heat exchanging tube. Channels formed by engaging the grooves with gradually changed depth and the side edge may further control the flow rate and flow direction of the refrigerant.

Step S24: sealing and fastening the abutted portions of the bar-shaped plates.

A tube body may be formed following the above steps. In this case, the channels on the bar-shaped plate are in communication with the inner space of the tube body, and thus become the passages through which the refrigerant flows into or out of the tube body. In step S22, grooves may be manufactured on both of the joint side edges, extend in the thickness direction of the joint side edges respectively, and are positioned correspondingly. Accordingly, in step S23, i.e., bring the joint side edges of the bar-shaped plates into contact with each other along the surfaces of the bar-shaped plates, the two corresponding grooves of the bar-shaped plates are open towards one another to form a passage communicating with the inner space of the tube body after the two grooves abut against each other. Size of the opening of the passage may be adjusted by adjusting the depth of the grooves or the length of the grooves along the side edge.

Furthermore, in step S22, in manufacturing the grooves, the intervals between the grooves on the same side edge may be designed to be gradually changed, so that the intervals between the finished channels of the tube body changes gradually. When the guide tube is desired, the intervals between the channels may be adjusted freely according to actual use requirement, and thus the distribution amount of the refrigerant may be adjusted. This facilitates the refrigerant to be distributed inside the heat exchanging tube evenly.

Further, in step S22, in addition to manufacturing the groove, through holes may also be manufactured on the bar-shaped plate. That is, the finished tube body not only has refrigerant passages formed by the grooves and the joint side edge, but also has passages formed by the through holes.

According to this embodiment, simply by manufacturing the grooves on the joint side edge of the bar-shaped plate, and jointing the side edges to form the tube body, the passages through which the refrigerant flows are then formed directly by the grooves and the joint side edge, so the manufacture process is simple. Also, the size of the opening of the passages formed by jointing the joint side edges is easy to be controlled precisely, thus facilitating the quality control for production in batches. Furthermore, the passages are formed by two joint side edges engaged along the surfaces of the bar-shaped plates, so the area of the portion for fastening is relatively big, and the fastening process is easy to be implemented, regardless of rivet joint, welding, or any other fastening way.

Figure 4:
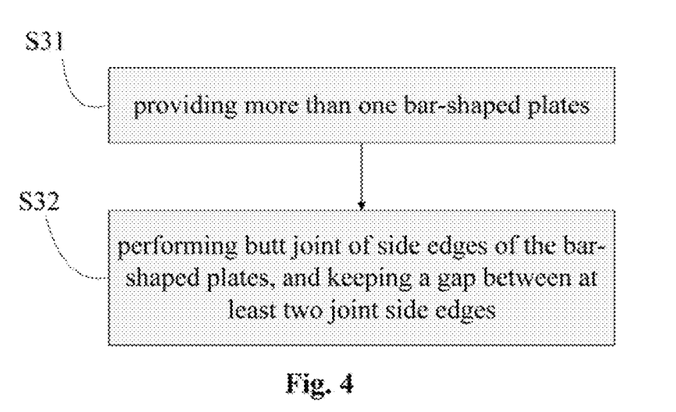
FIG. 4 is a flow chart of a third specific embodiment of the method for manufacturing a refrigerant guide tube according to the present application.

Please refer to FIG. 4, which is a flow chart of the third specific embodiment of the method for manufacturing a refrigerant guide tube according to the present application.

In the third specific embodiment, the manufacture method according to the present application includes the following steps:

Step S3: providing more than one bar-shaped plates.

Step S32: jointing side edges of the bar-shaped plates, and reserving a gap between at least two joint side edges.

A tube body with lateral gap is formed via the above steps. That is, when the side edges of the bar-shaped plates are jointed, at least two joint side edges are not in complete contact with each other, with a certain gap being reserved between the two joint side edges to form a passage through which the refrigerant flows into or out of the guide tube.

This embodiment utilizes the gap between the joint side edges directly as a refrigerant flowing passage. The forming process of the tube body is just the forming process of the guide tube; so that processes such as manufacturing passages specially, fastening the joint side edges and the like are omitted, which allows the manufacture process to be simpler. Furthermore, forming the gap by jointing directly may easily control the size of the opening of the passage as well.

Also, to further improve the distribution uniformity of refrigerant, in step S32, the width of the gap between the joint side edges may be gradually changed. With the change of the pressure in the flowing direction of the refrigerant, the cross sectional area of the flowing passage is gradually changed and the corresponding flow of the refrigerant can be adjusted. With the arrangement of the passage, the distribution amount of the refrigerant flowing into or out of the guide tube can be adjusted, which may facilitate the refrigerant to be distributed evenly.

In step S32, surfaces of the at least two joint side edges (i.e., the surfaces of the bar-shaped plates) may be arranged opposite to each other to form the gap, and the two joint side edges may be bent in the same direction, so that an angle is formed between the orientation of the gap and the primary plane of the guide tube. The angle may be within a range of from 0° to 270°. Through adjusting the angle, the flowing direction of the refrigerant may be adjusted according to application requirement.

Please refer to FIGS. 5-1 to 5-4, which are schematic structural views of four kinds of bar-shaped plates used in the manufacture method according to the present application, respectively.

For each of the above embodiments, turbulent protrusions for causing turbulence of the refrigerant may be manufactured on the surfaces of the bar-shaped plates. For example, for the bar-shaped plate 1 having a saw tooth configuration on a single face as shown in FIG. 5-1, the turbulent protrusions are the saw tooth structure 12. For the bar-shaped plate 1 having a sine-wave configuration on a single face as shown in FIG. 5-2, another the turbulent protrusions are the sine-wave structure 13. For the bar-shaped plate 1 having protrusions on its surface as shown in FIG. 5-3, the protrusions 14 in shapes such as the hemisphere, tetragonal shape or the like form the turbulent protrusions. For the bar-shaped plate 1 having a corrugated configuration on two surfaces as shown in FIG. 5-4, the turbulent protrusions are the corrugated structure 15. Of course, the turbulent protrusions are not limited to the above turbulent structures; and they may be any structure capable of causing the turbulence of the refrigerant. When jointing the side edges of the bar-shaped plate 1, the surface having the turbulent protrusions is arranged inwards to form the inner wall of the tube body, thereby allowing the refrigerant to flow through the tube body with turbulent protrusions.

For all the above embodiments, the ratio of the inner cross sectional area of the guide tube to the overall area of the passage may be controlled within the range of 0.003 to 0.49. When the ratio falls into the range, the refrigerant may be better distributed.

The present application further provides a refrigerant guide tube used in a heat exchanger. The refrigerant guide tube includes a tube body and a passage extending through the tube wall of the tube body. The refrigerant flows into or out of the tube body through the passage. The tube body is the one formed by jointing longitudinal side edges of more than one bar-shaped plate. Generally, a metal flat plate may be adopted to form the tube body by jointing in a manner such as welding, compression joint, rivet joint, sliding joint or the like, in which the side edges may abut against each other inwards or outwards along the surfaces of the bar-shaped plates so that the tube body has a lateral ridge protruding outwards or inwards, or the side edges may also be overlap jointed.

The tube body of the guide tube is formed by jointing the side edges of the bar-shaped plates, so that the refrigerant passages on the guide tube can be manufactured before or during formation of the tube body. Thus, manufacturing the passages on the tube body directly is avoided and the manufacture process is simpler.

Figure 6:
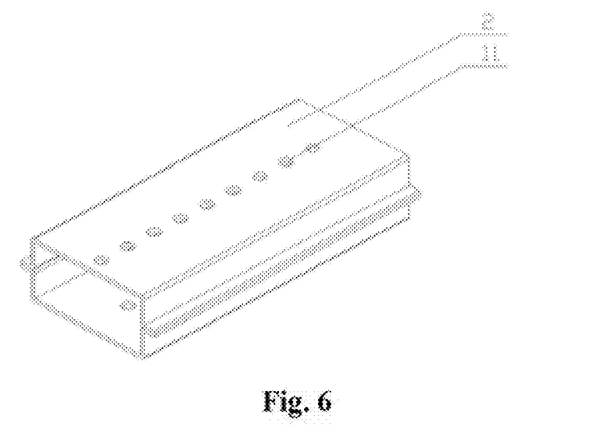
FIG. 6 is a schematic structural view of the first specific embodiment of the refrigerant guide tube according to the present application.

Please refer to FIG. 6, which is a schematic structural view of the first specific embodiment of the refrigerant guide tube according to the present application.

The tube body 2 may be formed by butt jointing longitudinal side edges of more than one bar-shaped plate 1, so that the tube body 2 may have through holes 11. The through holes 11 are located on the tube body 2 at the positions other than the butt jointing portion. The butt jointing portion is just the position at which the joint side edges are engaged. The through holes 11 form passages through which the refrigerant flows into or out of the guide tube.

The through holes 11 in the tube body 2 may be formed before the guide tube 2 is formed. Thus, substances such as burrs, shavings and the like are generated at the edge of the through holes 11 during manufacturing the through holes 11, and the bar-shaped plate 1 may be processed directly to remove the burrs, shavings and the like before forming the tube body 2. As such, there is no need for cleaning the inside of the tube body 2, resulting in easier processing. Therefore, it may avoid the through holes 11 from being blocked by the burrs, shavings and the like.

Figure 7:
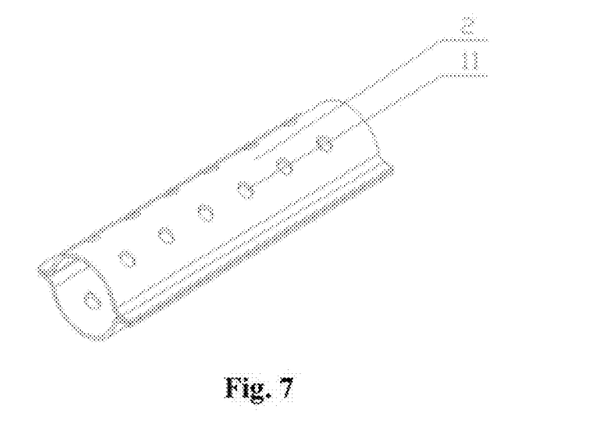
FIG. 7 is another schematic structural view of the first specific embodiment of the refrigerant guide tube according to the present application.

Please refer to FIG. 7, which is another schematic structural view of the first specific embodiment of the refrigerant guide tube according to the present application. Through holes 11 may be provided in the tube wall of the tube body 2 and distributed in the circumferential direction of the tube body 2. As shown in FIG. 7, two rows of through holes are provided in the upper half and the lower half of the tube body 2. The distribution of the through holes 11 in the circumferential direction of the tube body 2 may improve flowing uniformity of the refrigerant.

Figure 8:
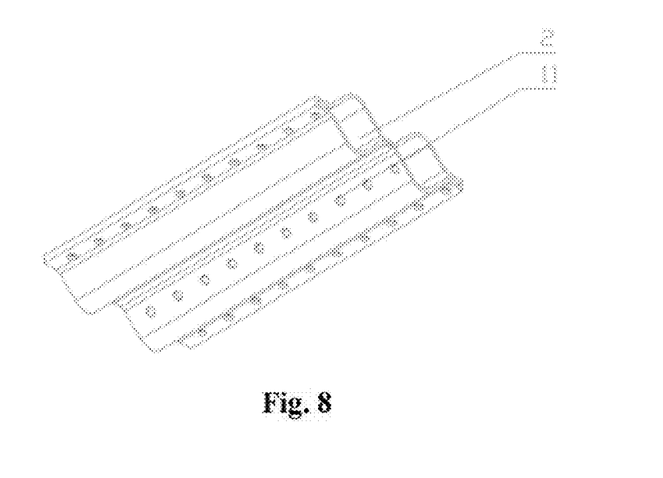
FIG. 8 is further another schematic structural view of the first specific embodiment of the refrigerant guide tube according to the present application.

Please refer to FIG. 8, which is further another schematic structural view of the first specific embodiment of the refrigerant guide tube according to the present application.

The surfaces of the joint side edges forming the tube body 2 (i.e. the surface of each of the bar-shaped plates 1) are arranged opposite to each other, and have a clearance therebetween. Also, the joint side edge is provided with through holes 11 therein. As shown in FIG. 8, the upper side and the lower side of the lateral ridge of the tube body 2 each are provided with through holes 11 extending in the thickness direction. With such structure, the orientation of the through holes 11 may be adjusted according to requirement, thereby adjusting the flowing direction of the refrigerant.

Figure 9:
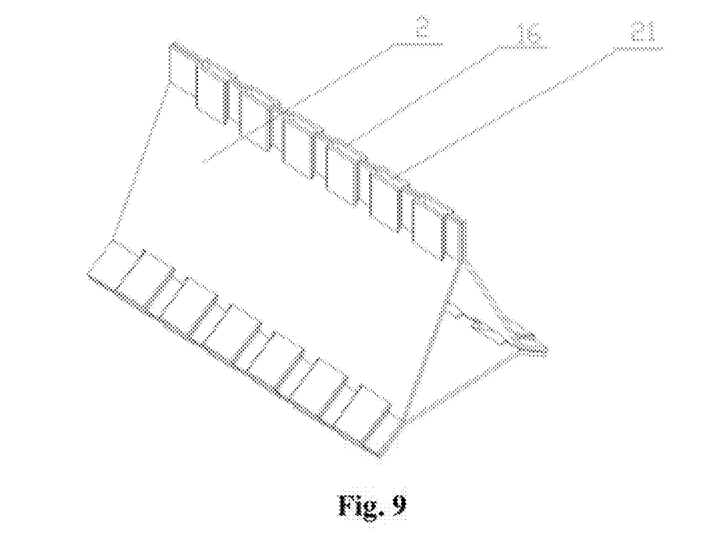
FIG. 9 is a schematic structural view of the second specific embodiment of the refrigerant guide tube according to the present application.
Figure 10:
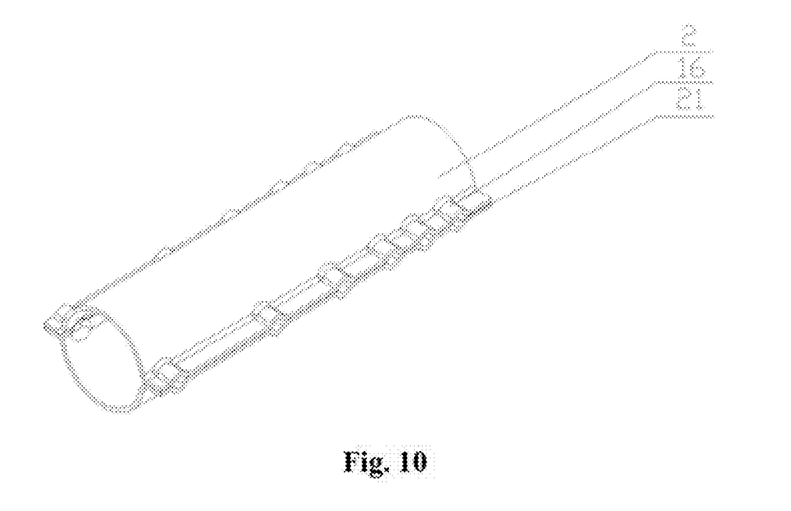
FIG. 10 is another schematic structural view of the second specific embodiment of the refrigerant guide tube according to the present application.

Referring to FIGS. 9 and 10, FIG. 9 is a schematic structural view of the second specific embodiment of the refrigerant guide tube according to the present application; and FIG. 10 is another schematic structural view of the second specific embodiment of the refrigerant guide tube according to the present application.

The tube body 2 may be formed by engaging side edges of the bar-shaped plates 1 along the surfaces of the bar-shaped plates 1. At least one joint side edge of the tube body 2 is provided with grooves 16 extending in the thickness direction. The grooves 16 are open towards the other joint side edge. The grooves 16 and the other joint side edge form channels 21 to serve as passages through which the refrigerant flows, i.e. there are cavernous passages 21 on the lateral ridge formed by the joint side edges on the tube body 2. The tube body 2 as shown in FIG. 9 is formed by jointing three bar-shaped plates. The cross sectional shape of the grooves 16 may be arc, rectangular, or the like, and thus the cross sectional shape of the corresponding passages is arc or rectangular. The depth and length of the grooves 16 are related to the cross sectional area of the formed passages. The depth of the grooves 16 may be gradually changed, so that the cross sectional area of the formed passages is gradually changed, by which the flow rate and the flow direction of the refrigerant may be controlled. Practically, the tube body 2 in this embodiment may also be formed by engaging the side edges of the bar-shaped plates 1 provided with through holes 11 therein, so that the tube body 2 has both refrigerant passages formed by the grooves 16 together with the joint side edge, and refrigerant passages formed by the through holes.

Further, each of the joint side edges of the tube body 2 is provided with grooves 16 extending in the thickness direction. Two grooves 16 of two joint side edges are open towards each other, and form a channel 21 as a passage through which the refrigerant flows. As shown in FIG. 9, two rectangular grooves 16 form a rectangular passage. In FIG. 10, two arc grooves 16 form a circular passage. Also, the cross sectional area of the passage may be adjusted by adjusting the depth of the grooves 16 or the length of the grooves 16 along the side edges. The tube body 2 of such structure may have passages at the jointing area of each pair of joint side edges. A tri-prism tube body 2 as shown in FIG. 9 is formed by three bar-shaped plates 1, in which each of the three lateral ridges has channels 21. A cylindrical tube body 2 shown in FIG. 10 is formed by two bar-shaped plates 1, in which each of the two lateral ridges formed by jointing the two bar-shaped plates has channels 21. Thus, the tube body 2 of such structure has passages distributed circumferentially, thereby improving the distribution uniformity of the flow of the refrigerant through the guide tube.

The intervals between the passages on the tube body 2 may be gradually changed from one end. As shown in FIG. 10, the intervals between the passages at the left end of the guide tube are relatively big. When the guide tube is needed, the distances of the intervals between the refrigerant passages may be changed according to actual design requirement in order to solve the problem that the mass flow rate of the refrigerant is gradually reduced along the flowing travel so as to cause the unevenness of distribution of the refrigerant. In this way, the flow of the refrigerant can be adjusted and it is helpful in facilitating the refrigerant to be distributed evenly.

In this embodiment, the passages of the guide tube are formed by directly jointing the joint side edges on the tube body 2, so the manufacture process is simple. Also, since the passages are formed by jointing the joint side edges, the size of the opening of such passages is easy to be controlled precisely, thereby facilitating the quality control for the products in batches. Furthermore, in manufacturing the passage, since the portion for fastening is the surfaces portion of the bar-shaped plates, the area of which is relatively big, the fastening process is easily to be implemented, regardless of rivet joint, welding, or any other fastening way.

Figure 11:
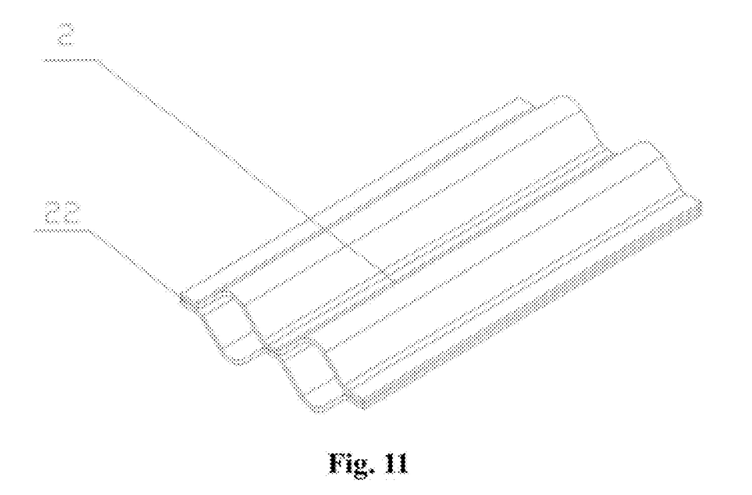
FIG. 11 is a schematic structural view of the third specific embodiment of the refrigerant guide tube according to the present application.

Please refer to FIG. 11, which is a schematic structural view of the third specific embodiment of the refrigerant guide tube according to the present application.

In this embodiment, there is a gap 22 between at least two joint side edges of the joint side edges forming the tube body 2. That is, at least one gap 22 extending in the axial direction of the tube body 2 exists in the tube body 2. Two gaps 22 formed by jointing two bar-shaped plates are shown in FIG. 11, and the gaps 22 form refrigerant flowing passages. The guide tube in this embodiment utilizes the gap 22 between the joint side edges directly as a refrigerant flowing passage, so that processes such as manufacturing passages specially, fastening the joint side edges and the like are omitted, which allows the manufacture process to be simpler and saves the production cost. Furthermore, forming the gap 22 by jointing directly may be easy to control the size of the opening of the passage as well.

Figure 12:
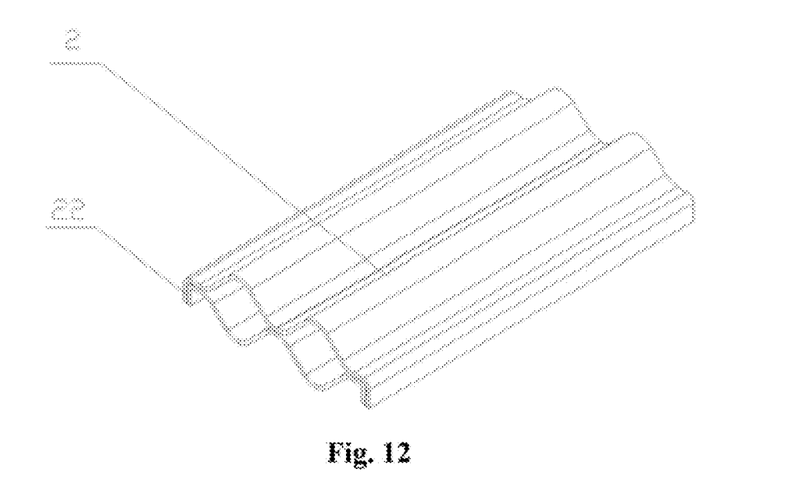
FIG. 12 is another schematic structural view of the third specific embodiment of the refrigerant guide tube according to the present application.

Please refer to FIG. 12, which is another schematic structural view of the third specific embodiment of the refrigerant guide tube according to the present application.

Surfaces of two joint side edges forming the gap 22 may be arranged opposite to each other, and the two joint side edges are bent in the same direction, so that an angle is formed between the orientation of the gap 2 and the primary plane of the guide tube. The angle may be within a range of from 0° to 270°. The angles associated with the gaps 22 may be adjusted according to requirement. Through adjusting the angle, the flowing direction of the refrigerant may be adjusted according to application requirement.

Also, to further improve the distribution uniformity of the refrigerant, the width of the gap 22 on the tube body 2 may be changed gradually. With the change of the pressure in the flowing direction of the refrigerant, the cross sectional area of the flowing passage is gradually changed. Thus, the corresponding flow of the refrigerant can be adjusted, thereby facilitating the refrigerant to be distributed evenly.

Please refer to FIGS. 13-1 to 13-5, which are schematic views of five cross sectional shapes of the refrigerant guide tube according to the present application, respectively.

For the above embodiments, the tube body 2 may have a cross section in various shapes, such as circular shape, quadrate shape, triangular shape, as well as character "8" shape. Of course, for the third specific embodiment, the cross sectional shape of the tube body 2 may have an opening. Such a tube body 2 is highly flexible, and may be applied to various types of heat exchangers and various operational environments, which is easy to be implemented in technique. It is to be noted that, the tube body 2 may has one or more tube cavities in the length direction. The cross section of the tube body 2 shown in FIG. 13-5 is of character "8"-shaped, that is, the tube body 2 as shown in FIGS. 8 and 11. The tube body 2 has two tube cavities. The two tube cavities may be formed by forming a tubular structure through jointing, and then stamping and welding the tubular structure in the length direction thereof. The tube cavities may or may not be in communication with each other. Refrigerant in the tube cavities may flow out through the respective passages, so as to allow the refrigerant to be distributed more evenly.

Figure 14:
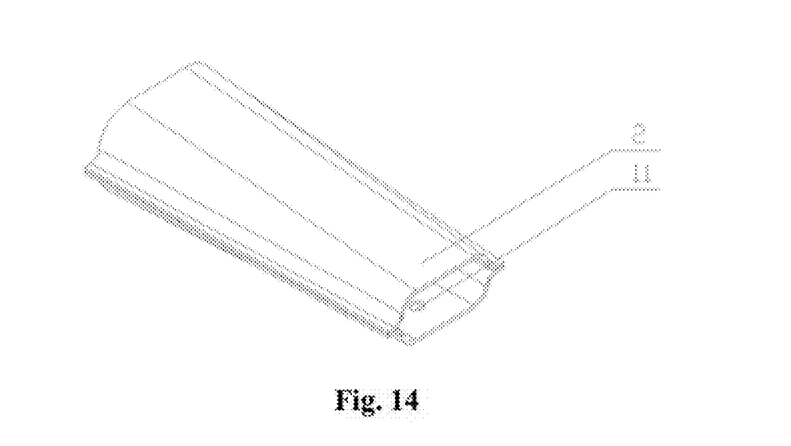
FIG. 14 is a schematic structural view of a fourth specific embodiment of the refrigerant guide tube according to the present application.
Figure 51:
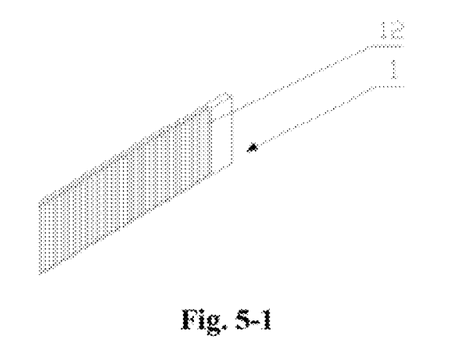
Figure 52:
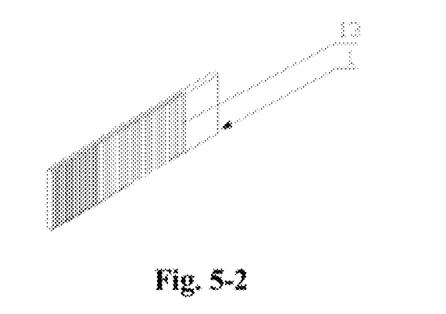
Figure 53:
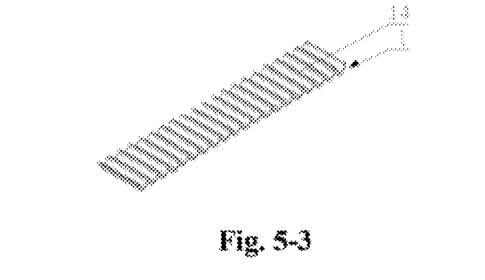
Figure 54:
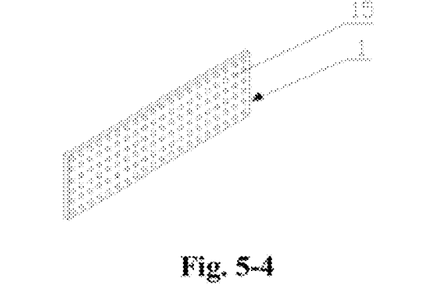
Figure 131:
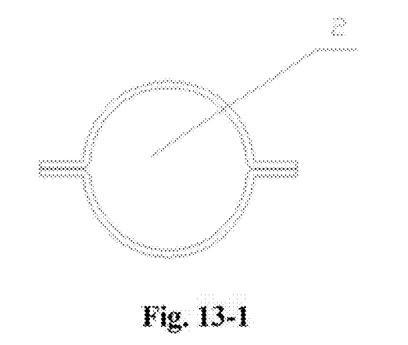
Figure 132:
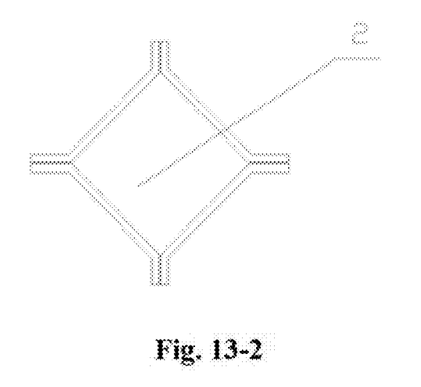
Figure 133:
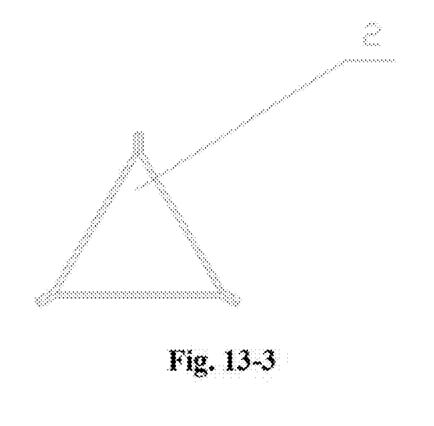
Figure 134:
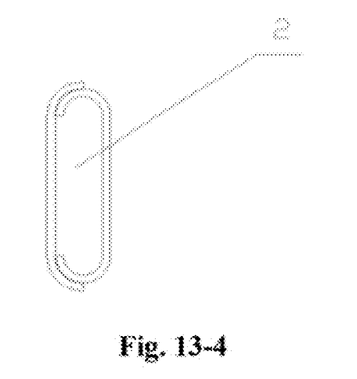
Figure 135:
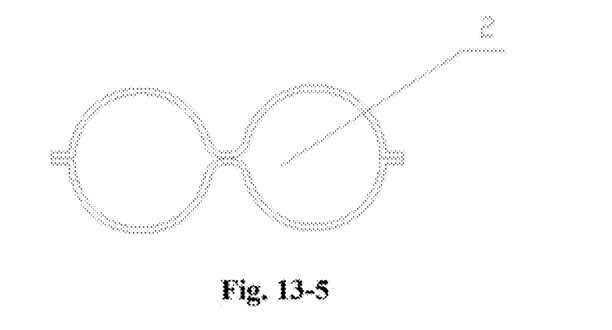
Figure 151:
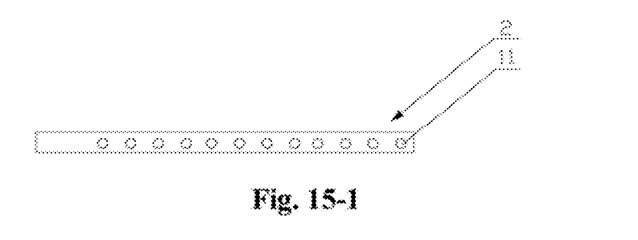
Figure 152:
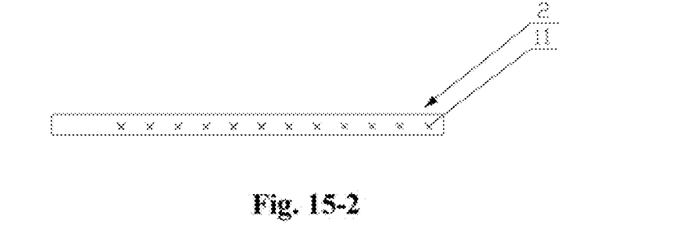
Figure 153:
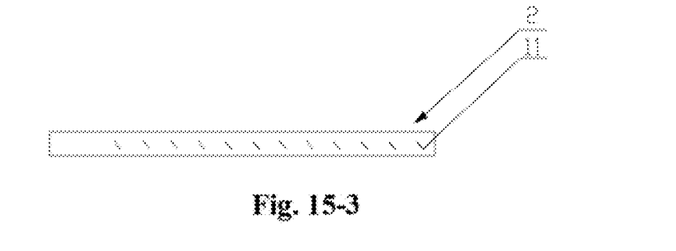
Figure 154:
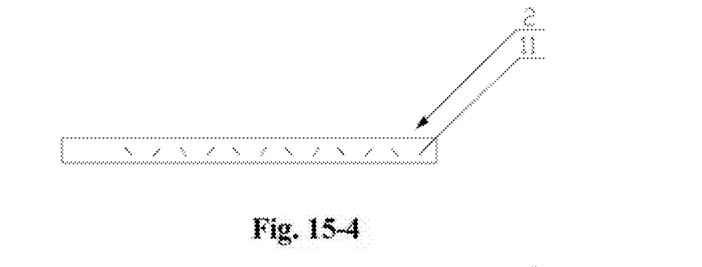
Figure 155:
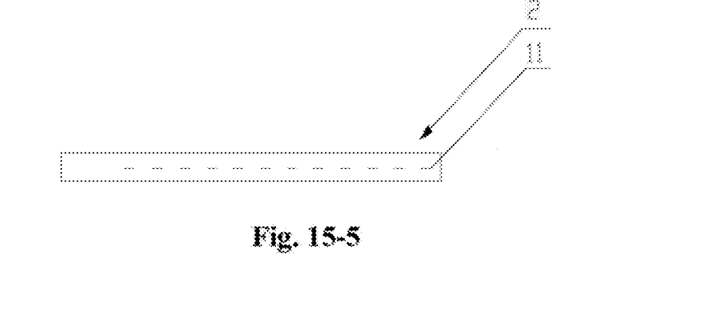

Please refer to FIG. 14, which is a schematic structural view of the fourth specific embodiment of the refrigerant guide tube according to the present application.

The cross sectional area of the tube body 2 may be changed gradually in the axial direction of the tube body 2, so as to allow the refrigerant in two phases in the tube body 2 to be mixed more evenly.

Furthermore, the inner wall of the tube body 2 may have turbulent protrusions for causing the turbulence of the refrigerant in the tube body 2. The turbulent protrusions may be, for example, a saw tooth structure, a sine-wave structure, or a corrugated structure, or may also be hemispherical, tetragonal protrusions distributed on the inner wall of the tube body 2. Such a guide tube may increase the turbulence of the refrigerant in two phases in the guide tube, so that layering of the gas and liquid refrigerant is avoided.

Please refer to FIGS. 15-1 to 15-5, which are schematic views of five cross sectional shapes of the passages of the refrigerant guide tube according to the present application, respectively.

For the first specific embodiment, the tube wall of the tube body 2 other than the joint portions have through holes 11 as passages through which the refrigerant flows into or out of the guide tube. The through holes 11 are formed before the tube body 2 is formed. That is, the through holes 11 are manufactured on the bar-shaped plates 1 firstly. The through holes 11 on the tube body 2 may be in various shapes, such as circular, X-shaped, oblique, character "八"-shaped, straight, and the like as shown in FIGS. 15-1 to 15-5.

The manufacture process of the tube body 2 is relatively simple, and various manufacture methods may be adopted. Also, various shapes of through holes may be manufactured selectively, so as to further control the flowing form of fluid.

Figure 161:
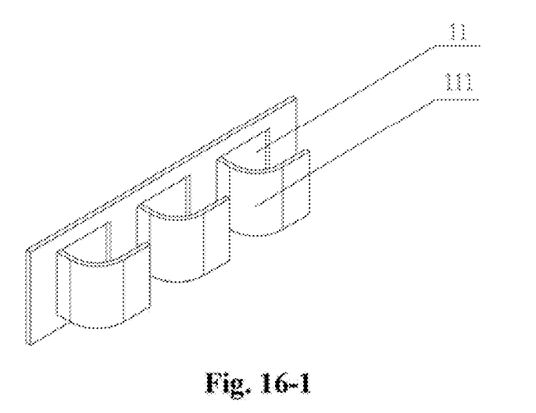
Figure 162:
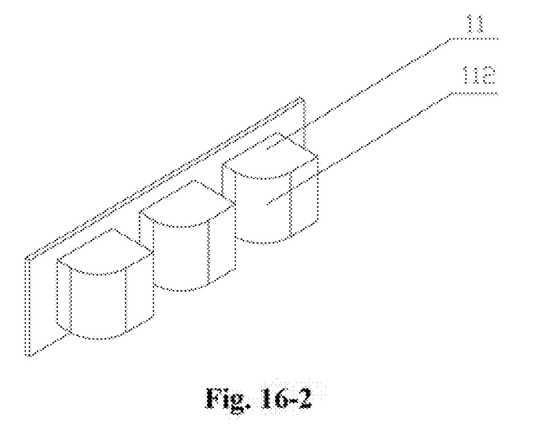
Figure 163:
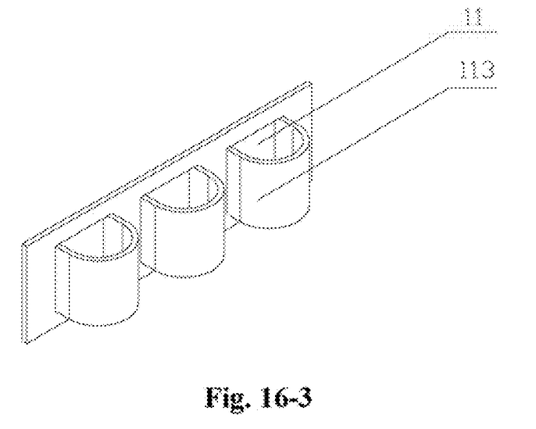

Please refer to FIGS. 16-1 to 16-3, which are three schematic structural views of the passages of the refrigerant guide tube according to the present application, respectively.

To further enhance the effect of the guiding flow, guiding baffle pieces for guiding the flow direction of the refrigerant may also be provided at the through holes 11 on the tube body 2. As shown in FIGS. 16-1 to 16-3, the guiding baffle piece may be a bending piece 111 extending from part of the edge of the through hole 11 (i.e., the root portion of the bending piece 111), so that the flow direction of the flowing refrigerant may be restricted by the bending piece 111 and the refrigerant cannot flow from the through holes 11 in all directions. Top of the bending piece 111 may also be overlap jointed to the edge of the through holes 11 opposite to the part of the edge of the top of the bending piece 111, so as to form an arc cover board 112 or an arcuate cover board 113, so that the refrigerant flowing from the through holes 11 can only flow in the vertical direction (namely, up or down) of the arc cover boards 112 or the arcuate cover boards 113, thereby controlling the flow direction and the flow rate of the refrigerant. The guiding baffle piece may be located on the inner wall or the outer wall of the tube body 2 without impacting the effect. The through holes 11 may also be the ones extending in the thickness direction of the tube wall of the tube body 2 and have the sectional area being gradually smaller, which may also serve for controlling the flow rate of the refrigerant.

For all the above embodiments, the ratio of the inner cross sectional area of the guide tube to the overall area of the passage may be controlled within the range of 0.003 to 0.49. When the ratio falls into the range, the refrigerant may be better distributed.

The present application further provides a heat exchanger including a heat exchanging tube, a manifold and a refrigerant guide tube inserted into the manifold, wherein the refrigerant guide tube is any of the guide tubes described above. Since the above refrigerant guide tube has the above-described technical effect, a heat exchanger having the refrigerant guide tube should also have the same technical effect, the description of which is omitted herein.

A heat exchanger, and a refrigerant guide tube thereof and the method for manufacturing the refrigerant guide tube according to the present application are described in detail above. Here, the specific examples are applied to elaborate the principle and embodiments of the present application, and the illustration of the above embodiments is only for assisting the understanding of the method and the core spirit of the present application. It should be noted that various improvement and modification can be made to the present application by the person skilled in the art without departing from the principle of the present application, and all those improvements and modifications fall into the protection scope of the claims of the present application.

What is claimed is:

1. A refrigerant guide tube used in a heat exchanger, the refrigerant guide tube comprising a tube body having passages extending through a wall of the tube body, wherein the tube body comprises two or more bar-shaped plates and two or more longitudinal joints, wherein each of the two or more bar-shaped plates comprises two longitudinal side edges, wherein each of the longitudinal side edges is angled outward away from a central portion of the tube body to define a jointing surface, wherein each longitudinal joint comprises two abutting longitudinal side edges which abut along their jointing surfaces and are jointed together, wherein the two abutting longitudinal side edges include one of the longitudinal side edges of one of the two or more bar-shaped plates and one of the longitudinal side edges of another one of the two or more bar-shaped plates, wherein the two abutting longitudinal side edges of at least one of the longitudinal joints are provided with grooves extending in a depth direction perpendicular to a longitudinal direction of the at least one longitudinal joint, wherein the grooves are formed between the two abutting longitudinal side edges of the at least one longitudinal joint such that the two abutting longitudinal side edges are spaced apart from one another at the grooves to form the passages, the passages having the shape of cylinders or rectangular cuboids, and wherein said passages extend from an inside of the guide tube to an outside of the guide tube such that a fluid communicates between the inside and outside of the guide tube through the passages.

2. The guide tube according to claim 1, wherein the tube body has at least two tube cavities.

\* \* \* \* \*

UNITED STATES PATENT AND TRADEMARK OFFICE
CERTIFICATE OF CORRECTION

PATENT NO. : 9,885,521 B2  
APPLICATION NO. : 13/991821  
DATED : February 6, 2018  
INVENTOR(S) : Gao et al.

Page 1 of 1

It is certified that error appears in the above-identified patent and that said Letters Patent is hereby corrected as shown below:

On the Title Page

Column 1  
Item (73) please add "DANFOSS A/S" as an Assignee

Signed and Sealed this  
Twentieth Day of February, 2024

Katherine Kelly Vidal  
Director of the United States Patent and Trademark Office